(12) United States Patent
Babai (10) Patent No.: US 9,721,311 B2
(45) Date of Patent: Aug. 1, 2017

(54) WEB BASED DATA MANAGEMENT (71) Applicant: INTERNATIONAL BUSINESS MACHINES CORPORATION, Armonk, NY (US)

(72) Inventor: Marcell D. Babai, Astoria, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 265 days.

(21) Appl. No.: 14/448,434

(22) Filed: Jul. 31, 2014

(65) Prior Publication Data

US 2016/0034517 A1   Feb. 4, 2016

(51) Int. Cl.
| | | |
|---|---|---|
| G06F 17/00 | (2006.01) | |
| G06F 7/00 | (2006.01) | |
| G06Q 50/02 | (2012.01) | |
| G06F 17/30 | (2006.01) | |

(52) U.S. Cl.
CPC ....... *G06Q 50/02* (2013.01); *G06F 17/30893* (2013.01)

(58) Field of Classification Search
CPC .................... G06F 17/30371; G06F 17/30864
USPC ....................................................... 707/688
See application file for complete search history.

(56) References Cited

U.S. PATENT DOCUMENTS

| | | | | |
|---|---|---|---|---|
| 8,832,116 B1* | 9/2014 | Chu | ................... | G06Q 10/0637 707/748 |
| 9,235,607 B1* | 1/2016 | Ross | ................ | G06F 17/30303 |
| 2003/0158924 A1* | 8/2003 | DeLegge | ............ | H04L 41/5009 709/223 |
| 2008/0235280 A1* | 9/2008 | Schoen | ............. | G06F 17/30286 707/999.003 |
| 2008/0281631 A1* | 11/2008 | Syth | ....................... | G06Q 10/10 705/2 |
| 2010/0005346 A1* | 1/2010 | Hamlescher | .......... | G06Q 10/10 714/57 |
| 2011/0258007 A1* | 10/2011 | Heggelund | ....... | G06F 17/30241 705/7.11 |
| 2012/0026002 A1 | 2/2012 | Vu et al. | | |
| 2012/0215913 A1* | 8/2012 | Okuno | ................... | H04L 43/00 709/224 |
| 2013/0083031 A1 | 4/2013 | Lehnherr et al. | | |
| 2014/0157172 A1* | 6/2014 | Peery | .................... | G06Q 10/10 715/771 |

* cited by examiner

*Primary Examiner* — Pavan Mamillapalli
(74) *Attorney, Agent, or Firm* — Lisa Ulrich; Andrew M. Calderon; Roberts Mlotkowski Safran, Cole & Calderon, P.C.

(57) ABSTRACT

Approaches are provided for assessing and displaying data. An approach includes determining one or more aggregate measures of data quality for data. The approach further includes assessing an overall data quality for the data based on the determined one or more aggregate measures of data quality. The approach further includes displaying the data, the determined one or more aggregate measures of data quality, and the assessed overall data quality.

17 Claims, 7 Drawing Sheets

WEB BASED DATA MANAGEMENT

FIELD OF THE INVENTION

The present invention generally relates to data management, and more particularly, to a method and system for processing oil and gas well data such that a quality of the oil and gas well data may by visualized via a web based graphical user interface.

BACKGROUND

Companies in the oil and gas industry need the ability to make accurate and timely decisions that depend heavily on good quality and reliable data. Data quality is synonymous with information quality, since poor data quality results in inaccurate information and poor business performance. For data to be qualified as being of good quality within the oil and gas industry, the data should possess some key characteristics such as accuracy, completeness, consistency, and timeliness.

Data accuracy measures the degree to which data correctly reflects the realities of conditions modeled. The oil and gas industry is highly reliant on accurate data because of the high risks involved. For example, planning a well using inaccurate information pressure data could result in serious complications, e.g., formation fracture or borehole instability, which could lead to cause significant damage to equipment while drilling the well.

Data completeness provides an indication of whether or not all the data necessary to meet the current and future business information demand are available in the data resource. One approach to measure completeness is to ensure that certain attributes always have assigned values. For example, a complete list may be required of all marker top and fluid fill predictions for all zones to be penetrated (or avoided).

Data consistency summarizes the validity, accuracy, usability and integrity of related data between applications and across a business. Quality data should be consistent across the board, such that data set values or naming conventions are uniform wherever such data sets occur. The consistency of data effectively ensures that data values in one data set are consistent with values in another data set. The expectation is that similar data values drawn from separate data sets should not conflict with each other.

Concurrency or timeliness refers to the degree to which information is current with the environment that the data models. This measures how up to date the data is, as well as its correctness in the face of possible time-related changes, which is particularly important in the oil and gas industry. An example of this is where Integrated Production Simulation Models (IPSM) are run using old or stale field production forecasts that do not reflect the changes to the reservoir since the forecast was first made, especially where current production data is available.

Data quality-related problems can cost oil and gas companies millions of dollars annually. Revenue opportunities are lost as a result of the inability to make strategic business decisions in a timely manner. In an attempt to solve data quality-related problems and achieve the key characteristics above, many companies employ data cleansing methodologies, resulting in short-term and costly improvements that have little effect in the long run, because the cleansing methodologies do not address the root causes of data defects.

SUMMARY

In a first aspect of the invention, a method is provided for assessing and displaying data. The method includes determining one or more aggregate measures of data quality for data. The method further includes assessing an overall data quality for the data based on the determined one or more aggregate measures of data quality. The method further includes displaying the data, the determined one or more aggregate measures of data quality, and the assessed overall data quality In another aspect of the invention, a computer program product is provided for assessing and displaying oil or gas well data. The computer program product includes a computer readable storage medium having program instructions embodied therewith. The program instructions are readable by a computing device to cause the computing device to obtain, by the computing device, oil or gas well data, determine, by the computing device, completeness, consistency, and concurrency of the obtained oil or gas well data, assess, by the computing device, an overall data quality for the obtained oil or gas well data based on the determined completeness, consistency, and concurrency of the obtained oil or gas well data, and display, by the computing device, the obtained oil or gas well data, the determined completeness, consistency, and concurrency, and the assessed overall data quality using a graphical user interface.

In a further aspect of the invention, a system is provided for assessing and displaying oil or gas well data. The systems includes a CPU, a computer readable memory and a computer readable storage medium. The system further includes program instructions to determine completeness, consistency, and concurrency of oil or gas well data. The system further includes program instructions to assess an overall data quality for the oil or gas well data based on the determined consistency, and concurrency of the obtained oil or gas well data. The system further includes program instructions to display, at a computing device with a screen display, at least a portion of a multidimensional map and one or more interfaces on the screen display, wherein the portion of the multidimensional map comprises a plurality of oil or gas wells. The system further includes program instructions to detect a first input at a location of a first interface of the one or more interfaces on the screen display. The system further includes program instructions to in response to the detecting the first input, filter the oil or gas well data used to render the plurality of oil or gas wells. The system further includes program instructions to detect a second input at a location of a second interface of the one or more interfaces on the screen display. The system further includes program instructions to in response to the detecting the second input, display the completeness, consistency, and concurrency of oil or gas well data as a function of all of the oil or gas well data obtained for a selected time or as a function of all of the oil or gas well data obtained and displayed for a selected time. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to data management, and more particularly, to a method and system for processing oil and gas well data such that a quality of the oil and gas well data may by visualized via a web based graphical user interface. More specifically, implementations of the invention provide systems and methods for assessing a quality of oil and gas well data based on aggregate measures (e.g., key characteristics) of data quality in real time such that the quality of the oil and gas well data may be intuitively visualized and interacted with on a multi-dimensional map. As should be understood by one skilled in the art, the utilization of oil and gas well data sets in the systems and processes described herein is only provided as one illustrative example contemplated by the present invention, and the systems and processes of the present invention may be implemented with any type of data sets without departing from the spirit and scope of the present invention.

In embodiments, users on a network can access a website configured to retrieve oil and gas well data from any database on the network, which may then be assessed for data quality based on aggregate measures of data quality. The aggregate measures of data quality may include completeness, consistency, and timeliness or concurrency of the oil and gas well data, and may be determined using various formulations discussed in detail herein. For example, the determination of completeness may include determining whether there is any missing data, the determination of consistency may include determining validity, accuracy, usability, and integrity of related data between applications and across a business, and the determination of concurrency may include determining a degree to which information is current within the environment that the data models.

In embodiments, once the quality of the oil and gas well data is assessed, the oil and gas well data, the data quality, and the determined aggregate measures of the data quality may be visualized on the multi-dimensional map at a snapshot in time. Additionally, in embodiments, various modes may be selected by a user to change which variables of the oil and gas well data are being visualized in any given snapshot, and the user may use the graphical user interface to scroll backwards and forwards in time such that the oil and gas well data may be seen at different snapshots in time. Advantageously, the systems and methods of the present invention allow for the quality of data to be assessed for a particular data set and for the data set, the quality of the data set, and the aggregate measures of data quality to be visualized and interacted with via a web based graphical user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
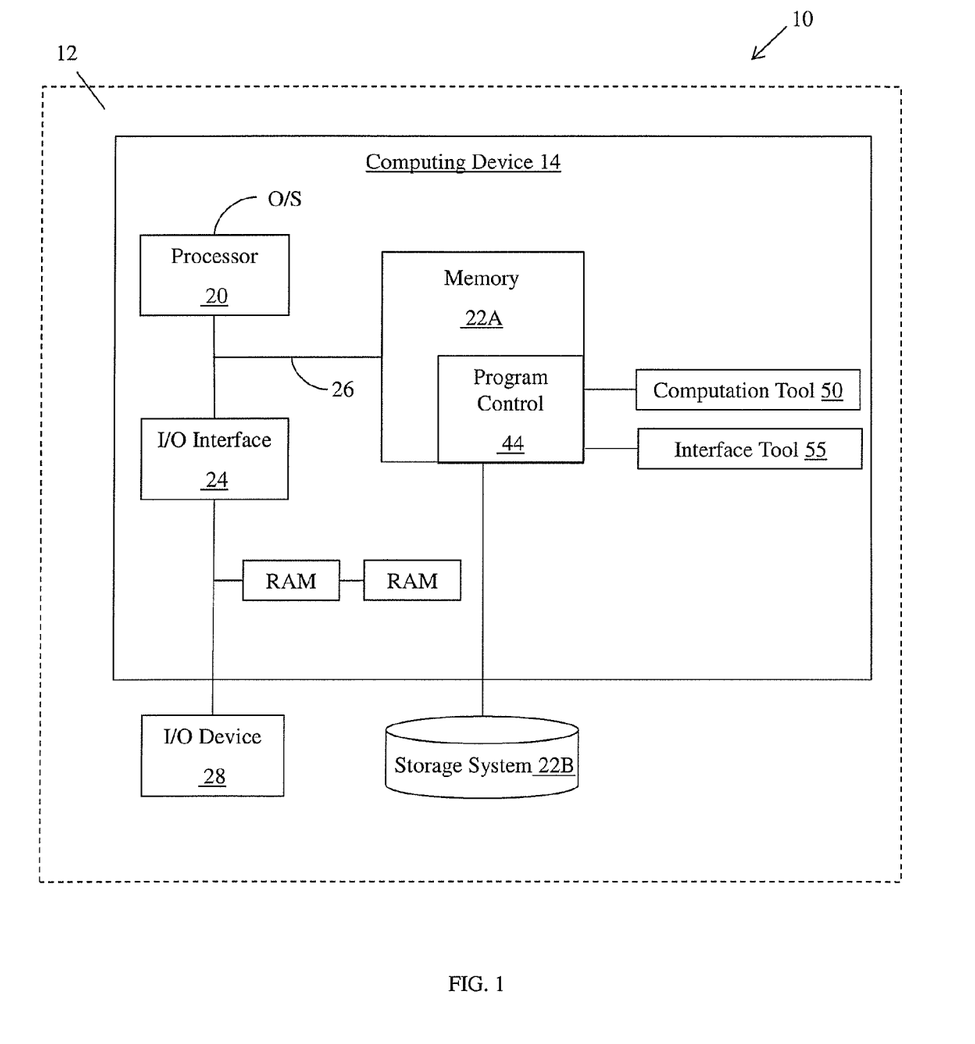
FIG. 1 shows an illustrative environment for implementing the steps in accordance with aspects of the invention.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a computation tool 50 and an interface tool 55 (e.g., a graphical user interface), which perform the processes described herein. The computation tool 50 and the interface tool 55 can be implemented as one or more program code in program control 44 stored in memory 22A as separate or combined modules. Additionally, the computation tool 50 and the interface tool 55 may be implemented as separate dedicated processors or a single or several processors to provide the function of the tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, the computation tool 50 may be configured to provide the functionality of determining, assessing, modifying, and/or manipulating data within a data set for display via the interface tool 55. In embodiments, the the computation tool 50 may be configured to determine aggregate measures of data quality for a data set. For example, the computation tool 50 may be configured to determine completeness of a data set by determining whether there is any missing data, consistency of the data set by determining validity, accuracy, usability, and integrity of related data between applications and across a business, and concurrency of the data set by determining a degree to which information is current within the environment that the data models. Additionally, in embodiments, the computation tool 50 may be configured to determine an overall quality of the data set based on the determined completeness, consistency, and concurrency of the data set.

By way of example, the interface tool 55 may be configured to provide the functionality of visualizing the data set, the determined overall quality of the data set, and the determined aggregate measures of data quality for the data set on a multi-dimensional map at a snapshot in time. Additionally, in embodiments, the interface tool 55 may be configured to allow a user to select various modes to change or modify which variables of the data set are being visualized in any given snapshot, and to scroll backwards and forwards in time such that the data may be manipulated and seen at different snapshots in time.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
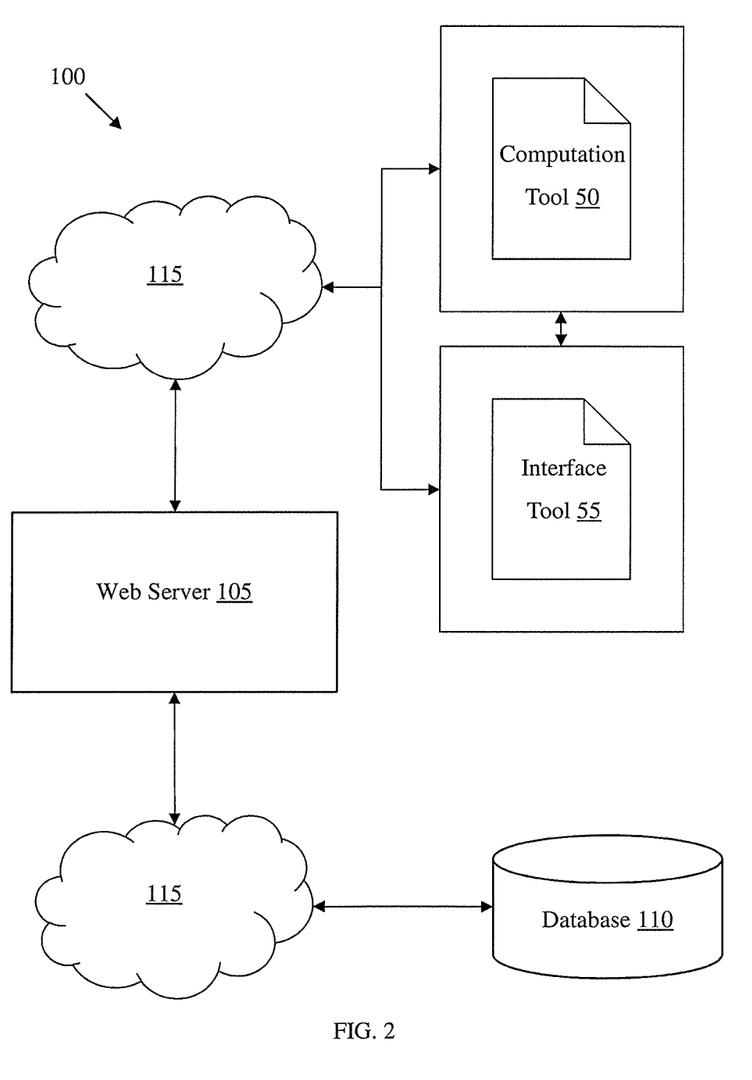
FIG. 2 shows a high level architecture for implementing processes in accordance with aspects of the invention.

FIG. 2 is a high level architecture for implementing processes in accordance with aspects of the present invention. More specifically, FIG. 2 depicts a data management system 100 comprising a web server 105 in communication with the computation tool 50, the interface tool 55, and one or more databases 110 (e.g., a storage system 22B as discussed with respect to FIG. 1) via a network 115 (e.g., the Internet, a local area network, a wide area network and/or a wireless network). The web server 105 may be, for example, either the hardware (e.g., a computing device) and/or the software (e.g., a computer application or program) that is configured to deliver web content (e.g., hosting of a website) that can be accessed through the network 115.

In embodiments, the interface tool 55 may be configured to communicate with the one or more databases 110 to obtain one more sets of data (e.g., oil and gas well data). For example, the interface tool 55 may communicate with the one or more databases 110 using an application programming interface (API) through the web server 105. More specifically, the interface tool 55 may be configured to send a JavaScript request for oil and gas well data to the web server 105 via the network 115, and a Java Database Connectivity (JDBC) API on the web server 105 may forward the data request to the one or more databases 110 via the network 115 for retrieval of the oil and gas well data.

The oil and gas well data request from the interface tool 55 may be any request associated with oil and gas data available through the one or more databases 110. For example, a user may provide input into the interface tool 55 that requests oil and gas well data for particular oil and gas wells owned by a business, or for oil and wells in a specific region of the world at a particular date and time. However, it should be understood that the present invention is not limited to the above exemplary requests and the requests may include anything associated with the oil and gas well data available through the one or more databases without departing from the spirit and scope of the present invention In embodiments, the computation tool 50 may be configured to receive the oil and gas well data directly from the web server 105 or indirectly from the web server 105 through the interface tool 55 for purposes of assessing overall quality of the oil and gas well data and other data management and manipulation described herein. For example, the computation tool 50 may be configured to receive the oil and gas well data to determine aggregate measures of data quality (e.g., completeness, consistency, and concurrency) for the oil and gas well data and determine an overall quality of the the oil and gas well data based on the determined aggregate measures of data quality.

In embodiments, the computation tool 50 may determine completeness of the data by determining whether there is any missing data. For example, determining completeness may comprise determining whether all appropriate rows or columns in a data set are present. In embodiments, the computation tool 50 may determine consistence of data by determining validity, accuracy, usability and integrity of related data between applications and across the business. For example, determining consistence may comprise determining whether the data is trust worthy or accurate based on a comparison between data from different sources. In embodiments, the computation tool 50 may determine concurrency of data by determining the degree to which information is current within the environment that the data models. For example, determining the concurrency may comprise determining how up to date the data is, as well as data's correctness in the face of possible time-related changes based at least on time stamps provided for each data point of the oil and/or gas well data. In embodiments, the computation tool 50 may determine an overall quality of the oil and gas well data based on the determined aggregate measures of data quality. For example, determining the overall quality may comprise taking a mathematical average of the determinations for completeness, consistency, and concurrency.

In embodiments, the interface tool 55 may be configured to generate a graphic user interface built into a browser using programming language, such as HyperText Markup Language, tool kits, e.g., open source modular JavaScript library, such as Dojo toolkits, and/or widgets, such as website or application widgets (e.g., a graphic user interface displayed on a computing device 14 as discussed with respect to FIG. 1) to visualize and allow for interaction of the oil and gas well data, the determined aggregate measures of data quality, and the overall quality of the data by a user. For example, the interface tool 50 may be configured to visualize the oil and gas well data, the determined aggregate measures of data quality, and the overall quality of the data in a graphical user interface comprising a multi-dimensional map (e.g., a two or three dimensional map). Additionally, in embodiments, the interface tool 55 may be configured to allow a user to select various modes to change which variables of the oil and gas well data are being visualized in any given snapshot, and to scroll backwards and forwards in time such that the data may be seen at different snapshots in time.

Figure 3:
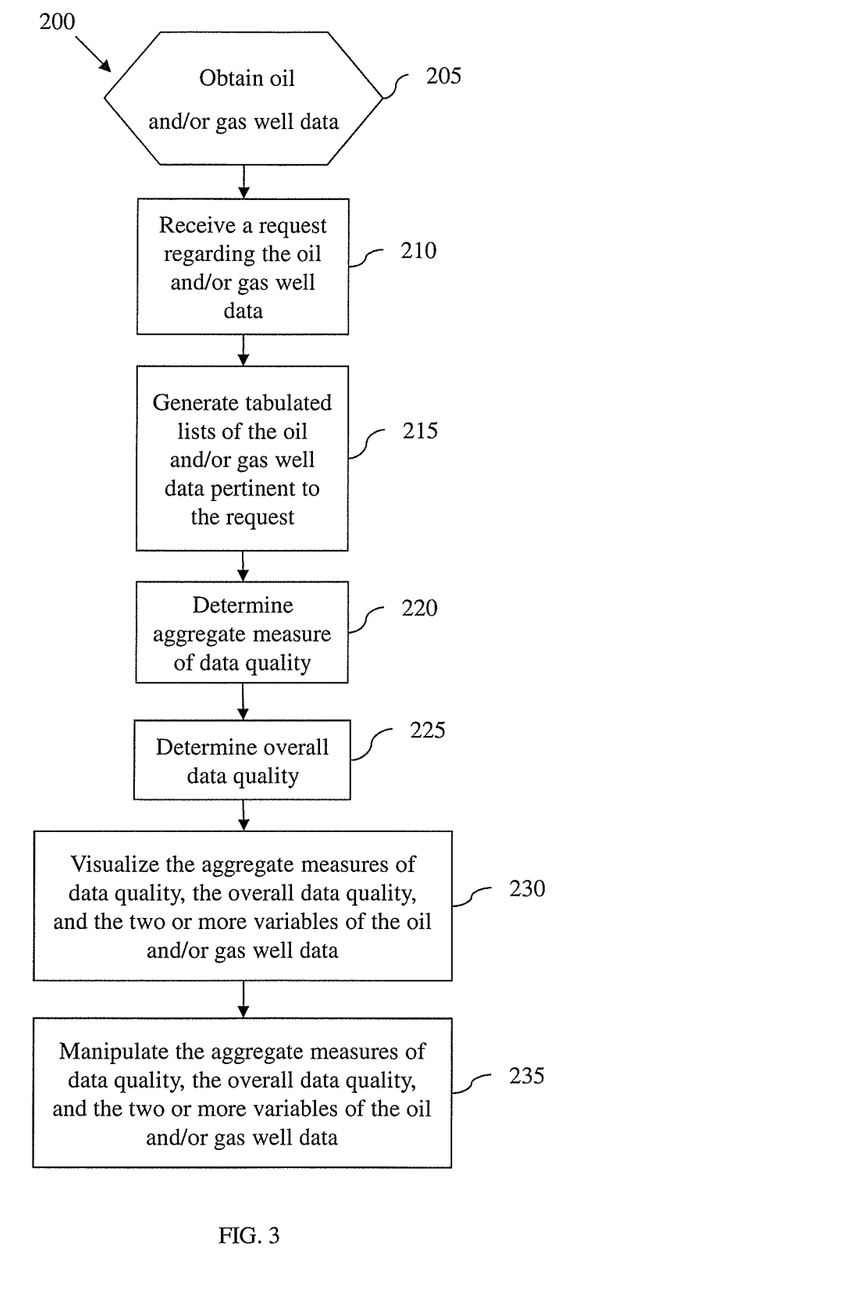
FIG. 3 shows an exemplary flow in accordance with aspects of the invention
Figure 7:
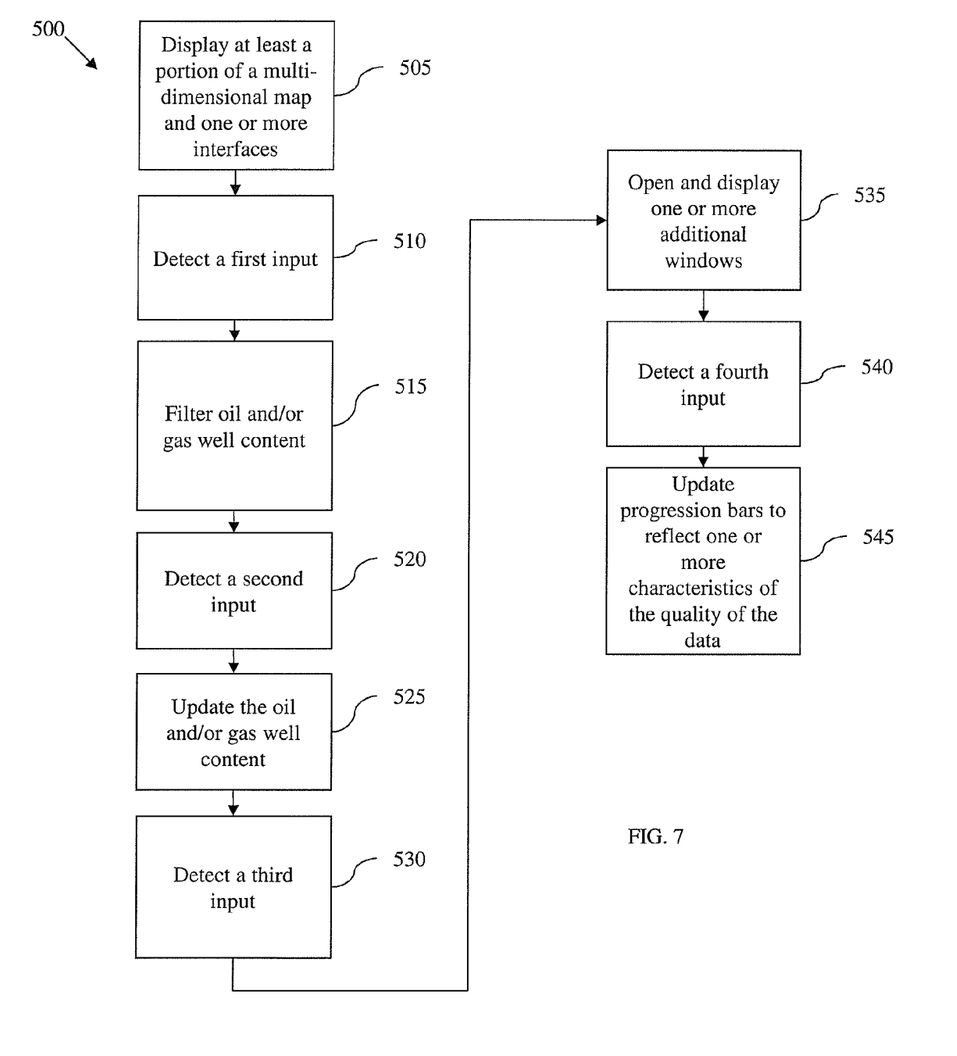
FIG. 7 shows an exemplary flow in accordance with aspects of the invention.

FIGS. 3 and 7 show exemplary flows for performing aspects of the present invention. The steps of FIGS. 3 and 7 may be implemented in the environments of FIGS. 1 and 2, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 3 is a flow diagram illustrating a process 200 for assessing and displaying oil and/or gas well data on a computing device in accordance with embodiments of the present invention, At step 205, oil and/or gas well data may be obtained. For example, oil and/or gas well data may be obtained from monitoring equipment at wells and/or from third party observations and saved into a database on a network of a business (e.g., the database 115, FIG. 2). In embodiments, the oil and/or gas well data may be saved in the database in such a manner that the oil and/or gas well data is linked with its respective sources and includes date and time stamps. For example, the oil and/or gas well data may be saved with metadata that comprises the source of the data and/or date and time information for the data.

At step 210, a request may be received regarding oil and/or gas well data of the business. For example, a user (e.g., a business owner or stakeholder) may provide input into a graphical user interface (e.g., a graphical user interface generated via interface tool 55, FIGS. 1 and 2) that requests information obtainable from the oil and/or gas well data generated or obtained in step 205 (e.g., information for particular oil and gas wells owned by a business, or for oil and wells in a specific region of the world at a particular date and time).

At step 215, in response to the received request, tabulated lists (e.g., a spreadsheet comprising rows and columns of data points for various variables) may be generated comprising the oil and/or gas well data pertinent to the request. For example, the web server (e.g., web server 105, FIG. 2) may be configured to retrieve the oil and/or gas well data including its metadata from the database that is related or impacted by oil and/or gas wells relevant to the request, and the web server or computation tool (e.g., web server 105 or computation tool 50, FIGS. 1 and 2) may be further configured to generate tabulated lists comprising the retrieved oil and/or gas well data and metadata. In embodiments in which the web server generates the tabulated lists, once the tabulated lists are generated, the web server may be configured to forward the tabulated lists for subsequent processing (e.g., directly to the computation tool 50 or indirectly to the computation tool 50 through the interface tool 55, FIGS. 1 and 2).

At step 220, aggregate measures of data quality may be determined for the retrieved oil and/or gas well data. For example, the computation tool (e.g., computation tool 50, FIGS. 1 and 2) may be configured to determine aggregate measures of data quality (e.g., one or more of completeness, consistency, and concurrency) for the retrieved oil and/or gas well data. In embodiments, determining completeness may include determining whether all appropriate rows or columns in a data set are present. For example, the computation tool may be configured to look through the oil and/or gas well data provided within the tabulated lists, and determine a total number of data points possible for each variable (e.g., oil production, gas production, amount of sand, well head pressure (WHP), bottom hole pressure (BHP), well head temperature (WHT), etc.), a total number of data points for each variable of the oil or gas well data that have a null value which indicates that no data collected, and a percentage of the total number of data points that have data in view of the determined total number of data points possible and total number of null values for the data points.

In embodiments, determining consistence may comprise determining whether the data is trust worthy or accurate based on a comparison between data from different sources. For example, the computation tool may be configured to look through the oil and/or gas well data provided within the tabulated lists, and determine a total number of data points possible for each variable (e.g., oil production, gas production, amount of sand, WHP, BHP, WHT, etc.), each data point that is not consistent for each variable based on a statistical measurement of variation (e.g., two or three standard deviation) within the data set and/or comparison with data points between different sources of the data, and a percentage of the total number of data points that have consistent data in view of the determined total number of data points possible and the total number of data points that are not consistent In embodiments, determining concurrency may comprise determining how up to date the data is, as well as the data's correctness in the face of possible time-related changes based at least on the time stamps provided for each data point of the oil and/or gas well data. For example, the computation tool may be configured to look through the oil and/or gas well data provided within the tabulated lists, and determine a total number of data points possible for each variable (e.g., oil production, gas production, amount of sand, WHP, BHP, WHT, etc.), each point of data that is not within a user defined time frame based on time stamps of the received data points, and a percentage of the total number of data points that have concurrent data in view of the determined total number of data points possible and total number of data points that are not concurrent or within the predetermined time frame.

At step 225, an overall data quality may be assessed for the retrieved oil and/or gas well data. For example, the computation tool (e.g., computation tool 50, FIGS. 1 and 2) may be configured to determine a mathematical average of the one or more percentages determined for completeness, consistency, and concurrency.

At step 230, the oil and/or gas well data, the one or more percentages determined for completeness, consistency, and concurrency for the oil and/or gas well data, and the overall data quality assessed for the oil and/or gas well data may be visualized or illustrated. In embodiments, the visualization or illustration may be displayed as a graphic user interface on a computing device (e.g., I/O device 28 of computing device 14 as discussed with respect to FIG. 1) using the interface tool. For example, the graphic user interface may include a multi-dimensional map comprising particular oil and/or gas wells pertinent to the received request, a key that shows two or more variables and associated data points being visualized on the multi-dimensional map, a quality box that shows the aggregate measures of data quality at a snapshot in time, and a time navigation bar for navigating through time such that the oil and/or gas well data may be seen at different snapshots in time, as discussed in detail herein with reference to FIGS. 3-5.

At step 235, the oil and/or gas well data, the one or more percentages determined for completeness, consistency, and concurrency for the oil and/or gas well data, and the overall data quality assessed for the oil and/or gas well data may be manipulated. In embodiments, the graphic user interface may be used by a user to filter the oil and/or gas well data via any two or more variables at a particular time, manipulate completeness, consistency, and concurrency of the oil and/or gas well data to be viewed as a function of all of the oil and/or gas well data received for a selected time or as a function of all of the oil and/or gas well data received and shown for a selected time, and manipulate the overall data quality to be viewed as a function of all of the oil and/or gas well data received for a selected time or as a function of all of the oil and/or gas well data received and shown for a selected time, as discussed in detail herein with reference to FIGS. 4-6.

Figure 4:
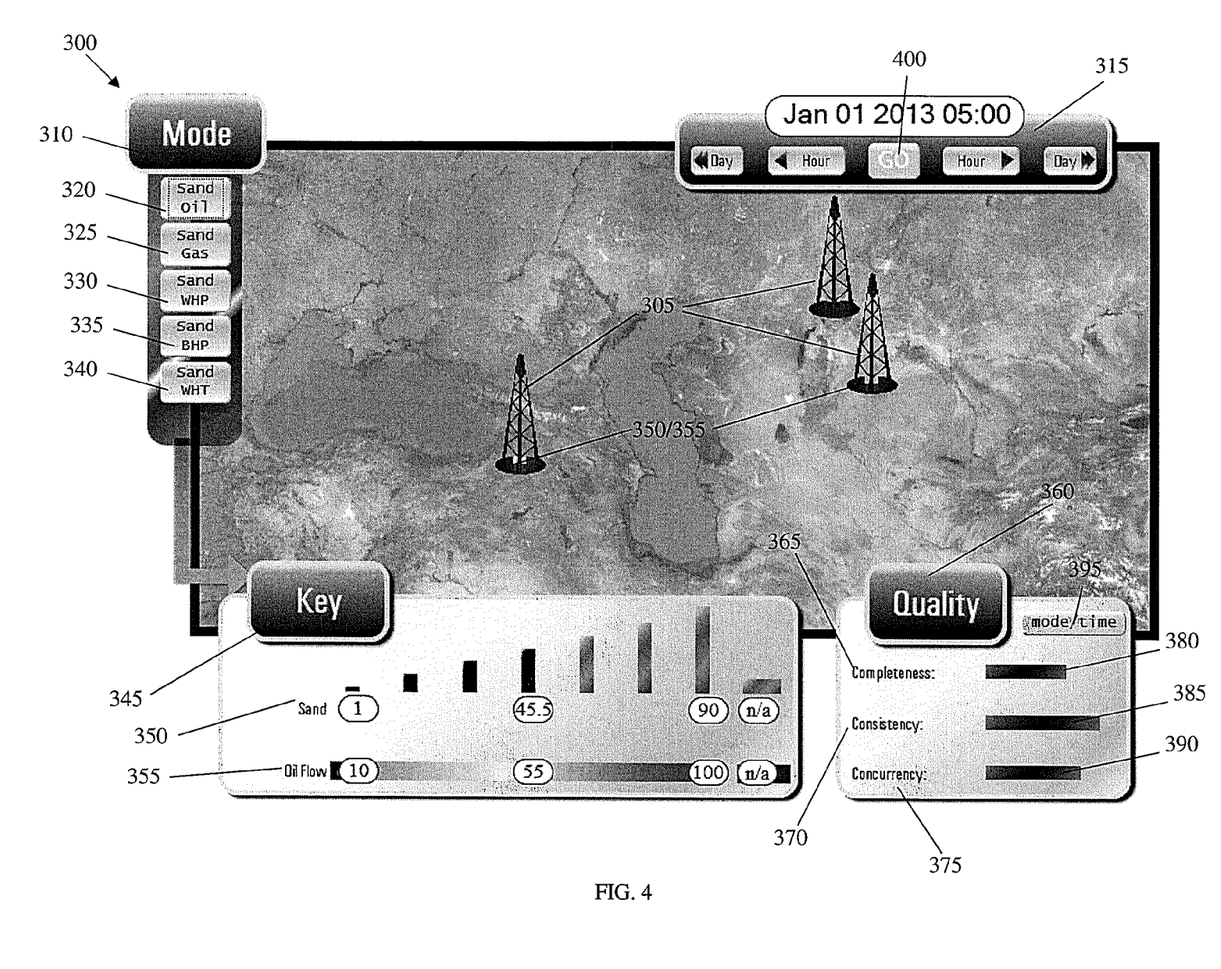
FIGS. 4-6 show a visual representation of an example of operation in accordance with aspects of the invention.
Figure 5:
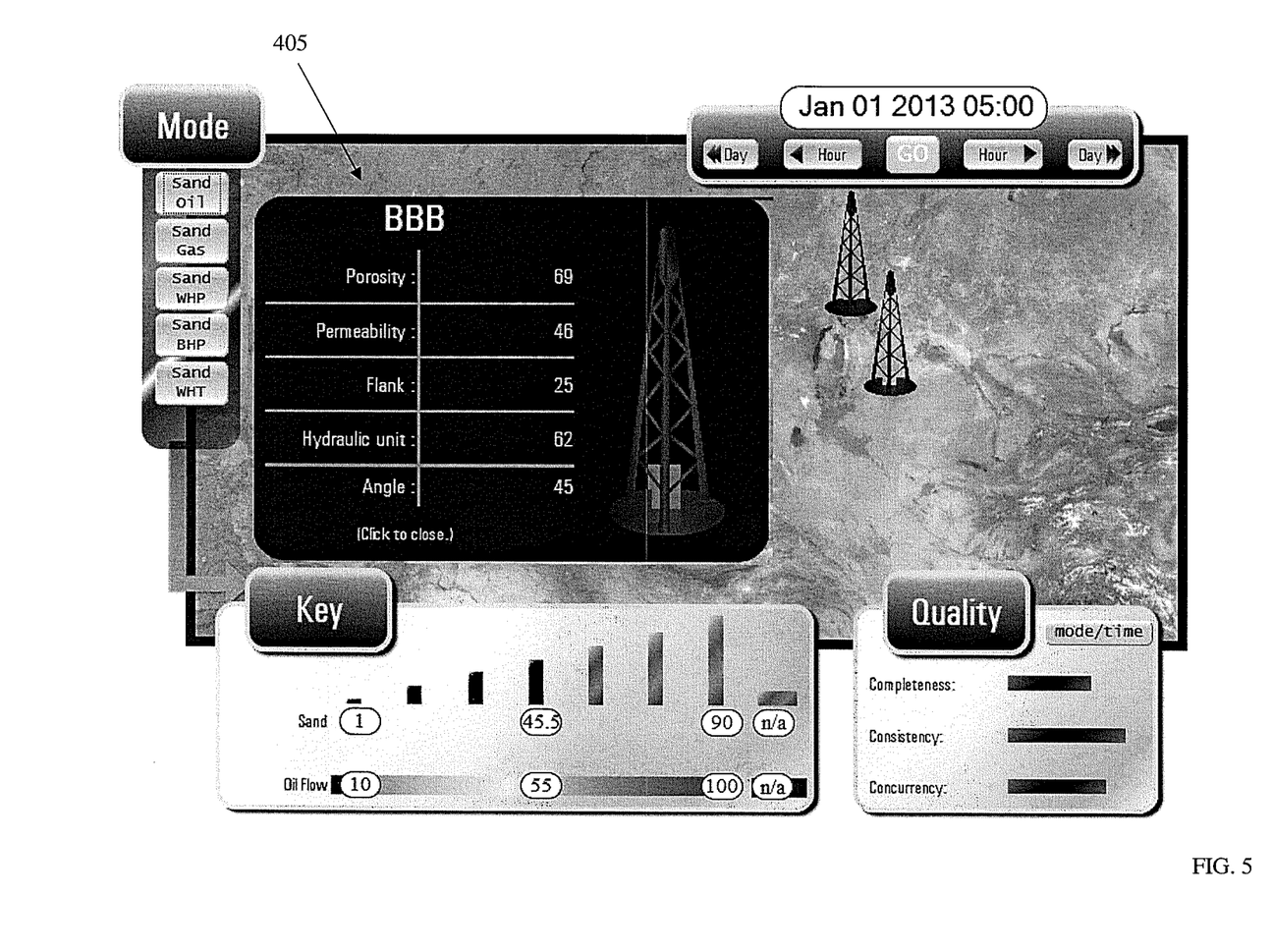
Figure 6:
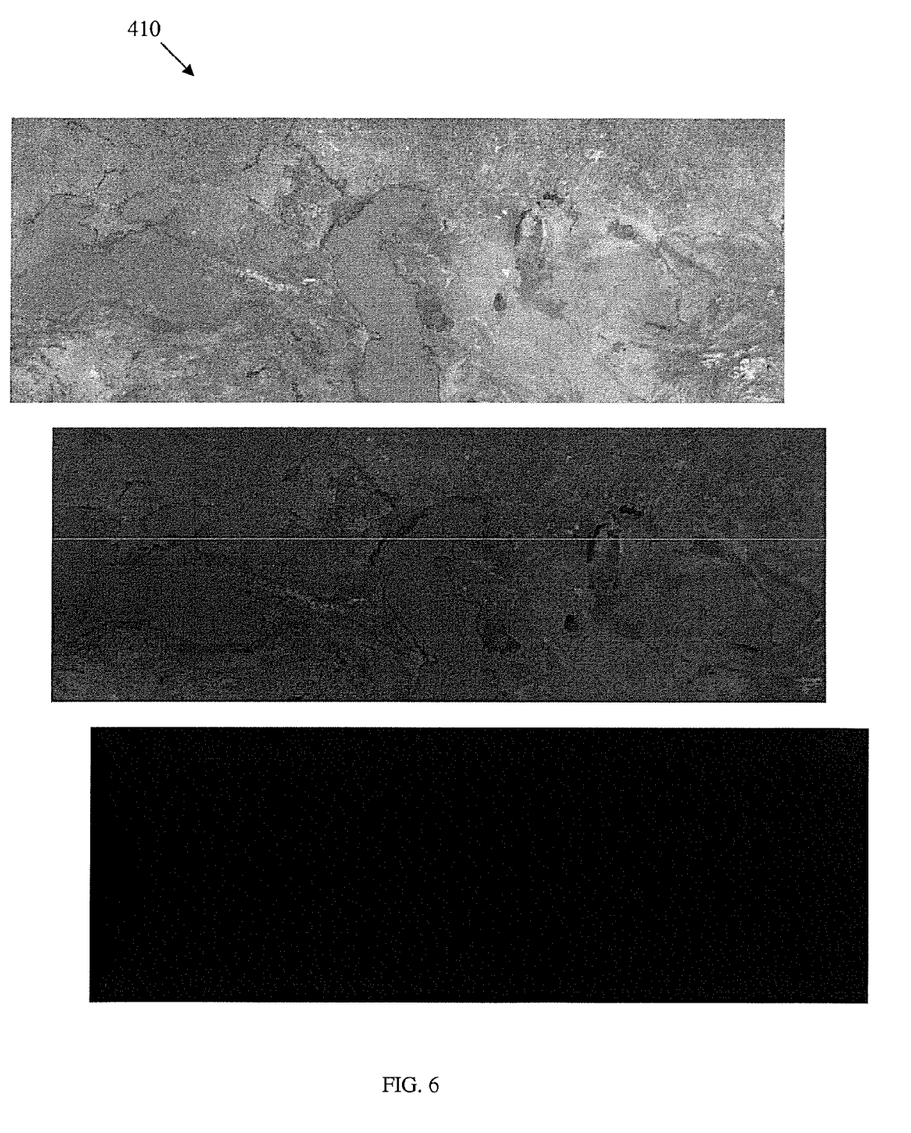

FIGS. 4-6 show different determinations, assessments, manipulations, and modifications of data from a data set that may be performed by the computation tool 55 and displayed to a user via the interface tool 55 in a graphical user interface. As shown in FIG. 4, the interface tool 55 may be configured to generate an illustration 300 including the oil and/or gas wells 305 pertinent to the received request and displayed in view of selectable modes 310 and a particular time 315. In embodiments, the modes 310 may be configured to modify or filter the oil and/or gas well data for each of the oil and/or gas wells 305 shown in the illustration 300 based on two or more variables. For example, the oil and/or gas well data may be filtered using the computation tool 50 based on two or more variables, e.g., oil production, gas production, amount of sand, WHP, BHP, WHT, etc., by way of toggle buttons or other methodologies represented by reference numerals 320, 325, 330, 335, and 340 respectively. To this end, the illustration 300 may be displayed as a graphic user interface on a computing device (e.g., I/O device 28 of computing device 14 as discussed with respect to FIG. 1) configured to receive user input and interaction.

The illustration 300 may further include data key 345, which provides a key for the oil and/or gas wells 305. For example, the two or more variables selected based on modes 310 may be visualized with respect to each pertinent oil and/or gas well 305 using a height or tilt of a bar 350 and a color or texture of the bar 355. In illustration 300, mode 320 is presently selected, and thus, the oil and/or gas wells 305 are presently showing the exemplary variables of amount of sand and oil production. As can be seen in the key 345, the height or tilt of the bar 350 easily displays the amount of sand being brought to the surface at each oil and/or gas well 305, and the color or texture of the bar 355 easily displays the amount of oil being brought to the surface at each oil and/or gas well 305.

In embodiments, the scaled height or tilt of the bar 350 shows approximate values calculated using a maximum or minimum function with the variable (e.g., amount of sand) provided via the oil and/or gas well data received from the database. The scaled color or texture of the bar 355 shows approximate values calculated using a maximum or minimum function with the variable (e.g., amount of oil) provided via the oil and/or gas well data received from the database. The null or not available (n/a) representation illustrates that no data was retrievable from the oil and/or gas well data for that variable.

In embodiments, the interface tool 55 may generate a graphic user interface that includes data quality 360 including aggregate measures of the oil and/or gas well data, such as completeness 365, consistency 370, and the concurrency 375. For example, the completeness 365, consistency 370, and the concurrency 375 assessed via the computation tool 50 may be displayed via the interface tool 55 in association with progression bars or other methodologies represented by reference numerals 380, 385, and 390 respectively. In embodiments, the completeness 365 may be illustrated by progression bar 380 based on the determined percentage accumulation of the oil and/or gas well data where null would mean no data was collected, as described with respect to step 220 of FIG. 3. The consistency 370 may be illustrated by progression bar 385 based on a percentage of the oil and/or gas well data being within a user defined statistical measurement of variation such as two or three standard deviation and/or based on a comparison of data between different sources of the data, as described with respect to step 220 of FIG. 3. The concurrency 375 may be illustrated by progression bar 390 based on a percentage of the oil and/or gas well data being within a user defined time frame of the particular time 315 (e.g., data collected within a two week time frame from the particular time 315), as described with respect to step 220 of FIG. 3.

In embodiments, the data quality 360 may further include a mode and/or time toggle button or other methodology represented by reference numeral 395 to allow a user to switch or manipulate the display of the progression bars 380, 385, and 390 from being representative of all the oil and/or gas well data at a current time to all the oil and/or gas well data shown at a current time. Accordingly, when the toggle button 395 is switched to all the oil and/or gas well data at a current time, the progression bars 380, 385, and 390 reflect the quality of all of the oil and/or gas well data received from the database pertinent to the request at the current time. On the other hand, when the toggle button 395 is switched to all the oil and/or gas well data shown at a current time, the progression bars 380, 385, and 390 reflect the quality of all of the oil and/or gas well data received from the database pertinent to the request at the current time and filtered via the selected mode 310.

In embodiments, a particular time 315 may be utilized via a user to manipulate the received oil and/or well data to view snapshots of the data at time intervals (e.g., hourly intervals). Additionally, the particular time 315 allows a user to scroll through the received oil and/or gas well data by day and/or hour. The "go" button or other methodology represented by reference numerals 400 may be configured to allow a user to go directly to a typed or input date and/or time. Accordingly, it should be understood that embodiments of the present invention allow a user to review historical and/or current data as a single snap shot or as a sequence of successive snapshots.

In embodiments, the illustration 300 may further allow for visualization of detailed statistical information for each oil and/or gas well 305, as shown in FIG. 5. For example, the oil and/or gas wells 305 may be selectable (e.g., clickable via an input device) to cause the interface tool 55 to generate an additional window 405 (e.g., a pop up window) that illustrates additional statistical information generated via the computation tool 50 such as porosity, permeability, flank, hydraulic unit, and angle with the variable data selected via mode 310. The additional window 405 may be selected again to close the additional window 405, or another well of the oil and/or gas wells 305 may be selected to close the additional window 405 and display another window (not shown) similar to additional window 405 for the newly selected well.

In embodiments, the illustration 300 may further allow for visualization of overall quality of the oil and/or gas well data by providing the illustration 300 using varying degrees of rendering quality or display corrections such as brightness or contrast. For example, as shown in FIG. 6, the display of the illustration 300 may be rendered via the interface tool 55 using a brightness or contrast correction 410 to easily illustrate an overall quality of the oil and/or gas well data. Therefore, as the overall data quality goes down, the illustration 300 may be configured to become darker or blurry. The overall data quality may be scaled as an aggregate of the previously assessed characteristics including completeness 365, consistency 370, and concurrency 375. For example, the overall data quality may be calculated via the computation tool 50 as a mathematical average of the percentages assessed for completeness 365, consistency 370, and concurrency 375, as discussed with respect to step 225 of FIG. 3.

Additionally, the mode and/or time toggle button 395 may be configured to also affect the overall data quality such that when the toggle button 395 is switched to all the oil and/or gas well data at a current time, the degree of rendering quality or display correction 410 reflects the quality of all of the oil and/or gas well data received from the database pertinent to the request at the current time. On the other hand, when the toggle button 395 is switched to all the oil and/or gas well data shown at a current time, the degree of rendering quality or display correction 410 reflects the quality of all of the oil and/or gas well data received from the database pertinent to the request at the current time and filtered via the selected mode 310.

FIG. 7 is a flow diagram illustrating a process 500 for interacting with oil and/or gas well data on a computing device in accordance with embodiments of the present invention. At step 505, the computing device displays at least a portion of a multi-dimensional map (e.g., a two or three dimensional map) on a screen display with one or more interfaces. The multi-dimensional map comprises content such as oil and/or gas well data (e.g., oil and/or gas wells 305 and height or color bars, FIG. 3). In embodiments, at least a portion of the content may be displayed using modified text or graphics to distinguish a portion of the content from other portions of the content and provide a user with additional information concerning a portion of the content. For example, as described with respect to FIGS. 4 and 6, the illustration 300 may be illustrated with distinguishing brightness or contrast to illustrate a total quality of the oil and/or gas well data. In embodiments, the oil and/or gas well data may be presented as a web page. In additional or alternative embodiments, the oil and/or gas well data may be presented as a hypertext markup language (HTML) or extensible markup language (XML) document.

At step 510, a first input (e.g., selection via I/O device 28, FIG. 1) may be detected on a toggle button (e.g., toggle buttons 320, 325, 330, 335, and 340, FIG. 4) in the displayed portion of the one or more interfaces (e.g., mode selector 310). At step 515, in response to detecting the first input, the oil and/or gas well content may be filtered on the display using a mode selected via the first input.

While the portion of the multidimensional map and one or more interfaces are displayed, at step 520, a second input (e.g., selection via I/O device 28, FIG. 1) may be detected on a time selector (e.g., particular time 315, FIG. 4) in the displayed portion of one or more interfaces. In embodiments, the second input may be input of a specific time or a scrolling through historical time frames, as discussed herein in detail with respect to FIG. 4. At step 525, in response to detecting the second input, the oil and/or gas well content may be updated and displayed based on a selected date and/or time.

While the portion of the multidimensional map and one or more interfaces are displayed, at step 530, a third input (e.g., selection via I/O device 28, FIG. 1) may be detected on a well within a portion of the multidimensional map (e.g., oil and/or gas well 305). At step 535, in response to detecting the third input, one or more additional windows with additional information regarding the selected well may be opened and displayed, as described with respect to FIG. 5.

In embodiments, displaying the one or more windows may comprise displaying the one or more windows on top of the displayed portion of the multidimensional map and one or more interfaces. For example, the one or more windows may be superimposed on top of the displayed portion of the multidimensional map and one or more interfaces. In some embodiments, the one or more windows may be semitransparent or opaque. In alternative embodiments, displaying the one or more windows may comprise opening the one or more windows in a separate web page.

While the portion of the multidimensional map and one or more interfaces are displayed, at step 540, a fourth input (e.g., selection via I/O device 28, FIG. 1) may be detected on a data quality selector (e.g., toggle button 395, FIG. 4) in the displayed portion of one or more interfaces. In embodiments, the fourth input may select how characteristics (e.g., completeness, consistency, and concurrency) of quality of the oil and/or gas well data may be displayed in one or more interfaces. At step 545, in response to detecting the fourth input, progression bars may be updated to reflect the quality of all of the oil and/or gas well data received from the database pertinent to the request at the current time or at the current time and filtered via the selection made in step 510.

In embodiments, the first, second, third, and fourth input may be received via an input device such as I/O device 28 (e.g., a mouse click). In embodiments, the first, second, third, and fourth input may be received in combination with use of a control item such as a selection tool.

As should be understood, aspects of the present invention allow for a user to leverage oil and/or gas well databases to assess, visualize, and interact with oil and/or gas well data pertinent to a particular business request. More specifically, the systems and methods of the present invention allow for a user to assess the quality of oil and/or gas well based on determined aggregate measures of data quality at a snapshot in time via a user friendly graphical user interface.

In embodiments, the invention provides a method that performs the process of the invention on a subscription, advertising, and/or fee basis. That is, a service provider, such as a Solution Integrator, could offer to provide data quality assessment and visualization functionality to a request for information or data on a network. In this case, the service provider can create, maintain, support, etc., a computer infrastructure, such as computer system 12 (as shown in FIG. 1) that performs the processes of the invention for one or more consumers. In return, the service provider can receive payment from the consumer(s) under a subscription and/or fee agreement and/or the service provider can receive payment from the sale of advertising content to one or more third parties In still another embodiment, the invention provides a computer-implemented method for assessing and visualizing the quality of data in response to receiving a request for information or data on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
    determine aggregate measures of data quality for oil or gas well data, including completeness, consistency and concurrency of the data, wherein determining the consistency comprises:
        determining a total number of data points that are not consistent for each variable based on a statistical measurement of variation within the data; and
        determining a percentage of a total number of data points that have consistent data based on the determined total number of data points possible and the total number of data points that are not consistent;
    assess an overall data quality for the oil or gas well data based on the determined consistency and concurrency of the obtained oil or gas well data;
    display, at a computing device with a screen display, at least a portion of a multidimensional map and interfaces on the screen display, wherein the portion of the multidimensional map comprises a plurality of oil or gas wells;
    detect a first input at a location of a first interface of the interfaces on the screen display;
    in response to the detecting the first input, filter the oil or gas well data used to render the plurality of oil or gas wells;
    detect a second input at a location of a second interface of the interfaces on the screen display; and
    in response to the detecting the second input, display the completeness, consistency, and concurrency of the oil or gas well data as a function of all of the oil or gas well data obtained for a selected time or as a function of all of the oil or gas well data obtained and displayed for a selected time.

2. The method of claim 1, further comprising:
    obtaining the data from a database of a business;
    receiving a request for information regarding the data; and
    generating a tabulated list of the data in response to the request.

3. The method of claim 1, wherein the determining the completeness comprises:
    determining a total number of data points possible for each variable of the data;
    determining a total number of data points for each variable of the data that have a null value which indicates that no data was collected; and
    determining a percentage of a total number of data points that have data based on the determined total number of data points possible and the total number of data points with the null value.

4. The method of claim 3, wherein the determining the concurrency comprises:
    determining a total number of data points that are not within a predetermined time frame of a selected time for each variable; and
    determining a percentage of a total number of data points that have concurrent data based on the determined total number of data points possible and the total number of data points that are not within the predetermined time frame.

5. The method of claim 4, wherein the assessing the overall data quality comprises determining a mathematical average of the percentage of the total number of data points that have data, the percentage of the total number of data points that have consistent data, and the percentage of the total number of data points that have concurrent data.

6. The method of claim 5, wherein the data is oil or gas well data and the displaying comprises generating a graphical user interface comprising a multi-dimensional map that shows the oil or gas well data, the determined one or more aggregate measures of data quality, and the assessed overall data quality.

7. The method of claim 1, wherein a service provider at least one of creates, maintains, deploys and supports the computer infrastructure.

8. The method of claim 1, wherein steps of claim 1 are provided by a service provider on a subscription, advertising, and/or fee basis.

9. The method of claim 1, further comprising deploying a system for assessing and displaying the data on a computing device, comprising providing a computer infrastructure operable to perform the steps of claim 1.

10. A computer program product for assessing and displaying oil or gas well data, the computer program product comprising a computer readable storage medium having program instructions embodied therewith, the program instructions readable by a computing device to cause the computing device to:
    obtain, by the computing device, oil or gas well data;
    determine, by the computing device, completeness, consistency, and concurrency of the obtained oil or gas well data, wherein determining the consistency comprises:
        determining a total number of data points that are not consistent for each variable based on a statistical measurement of variation within the oil or gas well data; and
        determining a percentage of a total number of data points that have consistent data based on the determined total number of data points possible and the total number of data points that are not consistent;

assess an overall data quality for the oil or gas well data based on the determined consistency and concurrency of the obtained oil or gas well data;

display, at the computing device with a screen display, at least a portion of a multidimensional map and interfaces on the screen display, wherein the portion of the multidimensional map comprises a plurality of oil or gas wells;

detect a first input at a location of a first interface of the interfaces on the screen display;

in response to the detecting the first input, filter the oil or gas well data used to render the plurality of oil or gas wells;

detect a second input at a location of a second interface of the interfaces on the screen display; and in response to the detecting the second input, display the completeness, consistency, and concurrency of the oil or gas well data as a function of all of the oil or gas well data obtained for a selected time or as a function of all of the oil or gas well data obtained and displayed for a selected time.

11. The computer program product of claim 10, wherein the determining the completeness comprises:

determining a total number of data points possible for each variable of the oil or gas well data;

determining a total number of data points for each variable of the oil or gas well data that have a null value which indicates that no data was collected; and determining a percentage of a total number of data points that have data based on the determined total number of data points possible and the total number of data points with the null determining a percentage of a total number of data points that have data based on the determined total number of data points possible and the total number of data points with the null value.

12. The computer program product of claim 11, wherein the determining the concurrency comprises:

determining a total number of data points that are not within a predetermined time frame of a selected time for each variable; and determining a percentage of a total number of data points that have concurrent data based on the determined total number of data points possible and the total number of data points that are not within the predetermined time frame.

13. The computer program product of claim 12, wherein the assessing the overall data quality comprises determining a mathematical average of the percentage of the total number of data points that have data, the percentage of the total number of data points that have consistent data, and the percentage of the total number of data points that have concurrent data.

14. The computer program product of claim 13, wherein:

the program instructions are further readable by the computing device to cause the computing device to:

receive, by the computing device, input from the graphic user interface that is indicative of an interaction by a user with the oil or gas well data; and generate, by the computing device, output from the graphic user interface that is responsive of the interaction by the user with the oil or gas well data; and the output causes a change in the display of the oil or gas well data that visualizes the interaction by the user with the oil or gas well data.

15. The computer program product of claim 14, wherein:

the received input from the graphic user interface comprises a toggling mechanism of the graphical user interface that is configured to change a manner in which the overall data quality is assessed;

the output from the graphic user interface is generated based on the changed manner; and the changed manner comprises assessing the overall data quality to be displayed as a function of all of the oil or gas well data obtained for a selected time or as a function of all of the oil or gas well data obtained and displayed for a selected time.

16. The computer program product of claim 15, wherein the change in the display of the oil or gas well data comprises changing a rendering quality or display correction of the graphic user interface.

17. A system comprising:

a CPU, a computer readable memory and a computer readable storage medium;

program instructions to determine completeness, consistency, and concurrency of oil or gas well data, wherein the determining the consistency comprises:

determining a total number of data points that are not consistent for each variable based on a statistical measurement of variation within the oil or gas well data; and determining a percentage of a total number of data points that have consistent data based on the determined total number of data points possible and the total number of data points that are not consistent;

program instructions to assess an overall data quality for the oil or gas well data based on the determined consistency, and concurrency of the obtained oil or gas well data;

program instructions to display, at a computing device with a screen display, at least a portion of a multidimensional map and one or more interfaces on the screen display, wherein the portion of the multidimensional map comprises a plurality of oil or gas wells;

program instructions to detect a first input at a location of a first interface of the one or more interfaces on the screen display;

program instructions to in response to the detecting the first input, filter the oil or gas well data used to render the plurality of oil or gas wells;

program instructions to detect a second input at a location of a second interface of the one or more interfaces on the screen display; and program instructions to in response to the detecting the second input, display the completeness, consistency, and concurrency of oil or gas well data as a function of all of the oil or gas well data obtained for a selected time or as a function of all of the oil or gas well data obtained and displayed for a selected time, wherein the program instructions are stored on the computer readable storage medium for execution by the CPU via the computer readable memory.

* * * * *